United States Patent Office 2,849,469
Patented Aug. 26, 1958

2,849,469

SUBSTITUTED DICYCLOPENTADIENYLIRON COMPOUNDS CONTAINING AT LEAST ONE ALDOMETHYL GROUP AND THEIR PREPARATION

Peter J. Graham, Wilmington, Del., assignor to E. I. du Pont de Nemours and Company, Wilmington, Del., a corporation of Delaware No Drawing. Application June 8, 1953
Serial No. 360,370

4 Claims. (Cl. 260—439)

This invention relates to a new class of stable organometallic compounds and more particularly to the carboxaldehyde derivatives of organometallic iron compounds.

Organometallic compounds in which the metal is directly linked to one or more organic radicals through carbon thereof are of interest not only from the theoretical standpoint but also because of many practical applications thereof. Thus tetraethyllead is widely used as an anti-knock agent for internal combustion engines, and many organomercury compounds have found use in the fungicide art and/or in the pesticide art. Many organometallic derivatives of the elements of groups I and II of the periodic table have found fundamental use in chemical syntheses, both as reactants and catalysts. Until recently little, if anything, was known of organometallic compounds of iron.

Dicyclopentadienyliron has been prepared (see Kealy and Pauson, Nature 168, 1039 (1951) and the copending application of Pauson, Ser. No. 291,567, filed June 5, 1952, now U. S. Patent 2,680,765, issued June 8, 1954) as have also some derivatives of this interesting organoiron compound, for instance, certain diacyl derivatives and the dicarboxylic acid (see Woodward et al., J. Am. Chem. Soc. 74, 3458 (1952)). Still other derivatives have also been prepared and form the subject of the copending applications of Weinmayr, for instance, the monoacyl derivatives, application Ser. No. 312,852, filed October 2, 1952, and the monocarboxylic acid, application Ser. No. 312,853, filed October 2, 1952, now U. S. Patent 2,683,157 issued July 6, 1954. These various compounds are of particular utility in many fields, such as anti-knock agents, fungicides, and pesticides and as intermediates to still other interesting and desirable organometallic compounds, but have characteristics which render them unsuitable, in certain applications.

This invention has as an object a new class of organometallic iron compounds which are soluble in aqueous systems in the form of their derivatives. Another object is the provision of a process for the preparation of these new organoiron compounds. Other objects will appear hereinafter.

These objects are accomplished by the invention of organoiron compounds having two cyclopentadienyl radicals attached to one iron atom and, on at least one of the cyclopentadienyl nuclei, a carboxaldehyde,

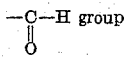

group.

The compounds of the present invention are nuclear carboxaldehyde substituted dicyclopentadienylirons, i. e., nuclear formyl substituted dicyclopentadienylirons, including similarly substituted, additionally nuclearly substituted dicyclopentadienylirons in which at least one of the cyclopentadienyl nuclei carries directly bonded to nuclear carbon thereof at least one carboxaldehyde, i. e., aldomethyl, i. e., formyl, —CHO, group. These compounds can also be described as dicyclopentadienyliron-carboxaldehydes or, more simply, dicyclopentadienyliron-aldehydes. These carboxaldehyde derivatives of dicyclopentadienyliron and the nuclearly substituted dicyclopentadienylirons are soluble in aqueous systems in the form of their derivatives thereby permitting their readier handleability in many fields. Thus, they form with ease alkali metal bisulfite addition compounds which are both water- and oxygen-stable. These alkali metal bisulfite addition complexes, which are not formed with, for instance, the mono- or diacetyl derivatives, permit handling of the dicyclopentadienyliron derivatives under normal conditions and allow the controlled regeneration of the new aldomethyldicyclopentadienyliron compounds as and where needed. This represents a desirable improvement over the known dicyclopentadienyliron compounds previously mentioned.

The following examples in which parts are by weight are illustrative of the invention.

*Example I*

A mixture of 18.6 parts of dicyclopentadienyliron, 30.5 parts (2 molar proportions based on the dicyclopentadienyliron) of phosphorus oxychloride, and 27 parts (2 molar proportions based on the dicyclopentadienyliron) of N-methylformanilide was heated to 50° C. and the resulting exothermic reaction controlled by occasional cooling as needed so as to maintain the reaction temperature in the range 50–55° C. over a period of 1.5 hours. The reaction mixture was then allowed to stand at room temperature under anhydrous conditions for 15 hours and finally reheated again to 55–60° C. for 30 minutes. During this over-all reaction cycle, hydrogen chloride was evolved and the reaction mixture darkened considerably and became more viscous. After cooling to room temperature, the viscous reaction mixture was poured directly onto an excess of ice and the resulting aqueous mixture extracted thoroughly with a total of about 420 parts of diethyl ether in several successive portions. The combined ether extracts were washed to neutrality with distilled water and finally dried over anhydrous magnesium sulfate. A portion (⅙) of the anhydrous diethyl ether extract was heated at steam bath temperature to remove the diethyl ether and the resultant dark, oily product treated with an aqueous alcoholic solution of sodium bisulfite. There was thus obtained after washing with ice/water a solid mixture of the cyclopentadienyl-(aldomethylcyclopentadienyl)iron and bis(aldomethylcyclopentadienyl)iron bisulfite addition products melting at 102–119° C.

The remaining portion (⅚) of the anhydrous diethyl ether extract was similarly concentrated by heating at steam bath temperatures and the remaining dark, oily residue cooled in an ice/water bath. The resultant red-brown crystalline product was removed by filtration. There was thus obtained about 9.3 parts of crude cyclopentadienyl(aldomethylcyclopentadienyl)iron and approximately an equal amount of a red-brown oil containing crude bis(aldomethylcyclopentadienyl)iron admixed with unreacted N-methylformanilide. The crystalline monocarboxaldehyde derivative was recrystallized three times—once each, respectively, from about 35 parts of anhydrous n-heptane, a mixture of about 35 parts of anhydrous n-heptane and about 8 parts of methylene chloride, and finally from a mixture of about 18 parts of anhydrous n-heptane and about 8 parts of anhydrous methylene chloride. After drying, there was thus obtained 1.4 parts of pure cyclopentadienyl(aldomethylcyclopentadienyl)iron as red-brown platelets. Upon freezing the combined n-heptane and methylene chloride filtrates from the above recrystallization, there was obtained about 3 parts of partially purified cyclopentadienyl- (aldomethylcyclopentadienyl)iron as a red powder. This, after drying, was finally purified by vacuum sublimation at 70° C. under a pressure corresponding to 0.5 mm. of mercury to give an additional 2.6 parts of pure product. The total yield of pure cyclopentadienyl(aldomethylcyclopentadienyl)iron was thus 4.0 parts—corresponding to 22.4% of the theoretical yield. The purified product exhibited ultraviolet and visible spectra, containing characteristic absorption peaks for the dicyclopentadienyl nucleus, the carbonyl group, and the aldehydic CH unit.

Analysis.—Calculated for $C_{11}H_{10}FeO$: C, 61.72%; H, 4.71%; Fe, 26.09%; molecular weight, 214. Found: C, 61.86%, 62.00%; H, 4.73%, 4.86%; Fe, 26.34%; molecular weight (ebullioscopic in benzene), 193, 202.

*Example II*

A mixture of 74.1 parts of finely ground dicyclopentadienyliron, 122 parts (two molar proportions) of phosphorus oxychloride was heated to 50° C. and 54 parts (one molar proportion based on the dicyclopentadienyliron) of N-methylformanilide was added dropwise, with stirring over a two-hour period. The reaction mixture was allowed to cool slowly to room temperature and after standing, at this temperature for 15 hours, it was then reheated to 50–55° C., held there for two hours, cooled and finally poured onto ice. The resultant dark violet reaction mixture was partially neutralized with 250 parts of solid sodium acetate trihydrate. The resulting mixture was then extracted for 45 hours in a continuous extractor using diethyl ether. The combined diethyl ether extracts were washed with water, then with 5% aqueous sodium carbonate solution to remove any traces of acid and finally with water. The washed extracts were dried over anhydrous magnesium sulfate and the diethyl ether removed by distillation. There was obtained 58.5 parts of crude dicyclopentadienylironcarboxaldehyde as a black oil which solidified on standing. The crude solid was sublimed at 70° C. under a pressure corresponding to 1 mm. of mercury, and the resultant 55.5 parts of partially purified dicyclopentadienylironcarboxaldehyde was further purified by recrystallization from a mixture of about 195 parts of n-heptane and about 65 parts of methylene chloride heated to 55° C. Upon cooling, filtration, and drying of the resultant solid, there was thus obtained 46.9 parts (55% of theory) of pure dicyclopentadienylironcarboxaldehyde as a reddish-brown, crystalline solid, exhibiting an unusual melting behavior.

A sample of the purified product, when heated slowly under polarized light, exhibited a transition temperature at 45° C. where the crystalline material becomes isotropic. As the temperature is slowly increased, the compound exists in a mesomorphic state until 124.5° C. is reached at which point a fluid transparent melt is obtained immediately. Between the initial transition temperature and the final melting point, the crystal shape gradually disappears and the smooth contours of liquid drops are assumed. It is to be noted that similar examination of cyclopentadienyl(acetylcyclopentadienyl)iron under polarized light shows no unusual physical changes. A normal melting point of the compound is observed at 85° C. with no earlier transition points.

The new formyl or carboxaldehyde derivatives of dicyclopentadienyliron can be prepared directly from the corresponding dicyclopentadienyliron compound and essentially equimolar portions of a phosphorus oxyhalide, e. g., phosphorus oxychloride, and a tertiary formamide, i. e., a formamide wherein both amide hydrogens are substituted, i. e., where the amide nitrogen is bonded, in addition to the amide carbonyl, only to hydrocarbon radicals which are preferably free of aliphatic unsaturation and normally of no more than seven carbons each. An equimolar proportion of both the phosphorus oxyhalide and the tertiary formamide being used are required for each carboxaldehyde substituent it is desired to introduce into the dicyclopentadienyliron structure. Thus, to prepare a monocarboxaldehyde derivative equimolar proportions of both the dicyclopentadienyliron and the mixed carboxaldehyde-forming reactants, i. e., the phosphorus oxyhalide and tertiary formamide are used. On the other hand, if it is desired to produce a bis(carboxaldehyde) derivative, then higher molar proportions based on the cyclopentadienyliron compound of both the phosphorus oxyhalide and the tertiary formamide should be used. A slight excess of the reactants being used to introduce the carboxaldehyde substituent can be used. However, for the best results in preparing the monocarboxaldehyde it is preferred to use substantially equimolar proportions of all reactants. For the preparation of the polycarboxaldehydes it is preferred that large molar excesses of the carboxaldehyde forming reactants be used.

The tertiary formamides, i. e., the N-formyl derivatives of secondary amines which together with the phosphorus oxyhalides form in equimolar proportions on a reactive basis the chemical reagents necessary to introduce the carboxaldehyde group or groups into the cyclopentadienyliron structure are represented by the following structural formula:

wherein R and R' which may be alike or different are monovalent hydrocarbon radicals, preferably free of aliphatic unsaturation, and generally of no more than seven carbons each. These R and R' groups may thus be aliphatic, aromatic, alkaromatic, araliphatic or cycloaliphatic in nature and may be alike or different. Because of their higher reactivity, it is advantageous that at least one of these R groups be aromatic in nature, i. e., that the tertiary formamide be an N-substituted formanilide. However, because of their readier availability, the tertiary formamides wherein both R groups are aliphatic hydrocarbon radicals, and especially the lower saturated aliphatic hydrocarbon radicals of one to four carbons each, constitute an especially preferred class of these reactants. A suitable specific example of the latter class is N,N-dimethylformamide which today is commercially available in large quantities at low cost.

These new carboxaldehyde derivatives of dicyclopentadienyliron can also be prepared by a Gattermann-Koch type synthesis using the aforesaid types of dicyclopentadienylirons with carbon monoxide and dry hydrogen chloride in the presence of a Friedel-Crafts type catalyst, commonly aluminum chloride, usually with cuprous chloride as a carrier—see Method 140, page 280, "Synthetic Organic Chemistry," Wagner-Zook, Wiley, 1953, and chapter 6, page 290, vol. V, "Organic Reactions," Wiley, 1949. These new carboxaldehydes can also be prepared from the corresponding dicyclopentadienylirons and hydrogen cyanide and hydrogen chloride in the presence of zinc chloride (or, alternatively with zinc cyanide and no hydrogen cyanide), followed by hydrolysis of the thus formed intermediate aldimine hydrochloride, the so-called Gattermann reaction—see Method 141, page 280, Wagner-Zook, supra. These latter routes are of frequent advantage in preparing the poly-carboxaldehyde derivatives.

These preparative methods, including the N-methylformanilide type formylation—see Method 142, page 281, Wagner-Zook, supra—can be carried out at temperatures ranging from as low as 0° to as high as 100° C. or thereabouts, but it is generally difficult to control the overall reaction at temperatures in the upper portions of this range and accordingly it is preferred to carry out the reaction at temperatures generally no greater than 55–60° C. For the highest yields, it is preferred to carry out the reaction at temperatures in the range 25–55° C.

An additional liquid reaction medium may or may not be used as is desired. In general because of the nature of the dicyclopentadienyliron starting materials, it is preferable to use no additional medium. However, in some instances, particularly in the higher temperature ranges where temperature control is more critical, the use of a liquid medium may be desirable. As a medium for the reaction, there may be used any inert liquid organic solvent conventionally used in the Friedel-Crafts type reaction. Amongst these, the normally liquid halogenated hydrocarbons, the hydrocarbon ethers, and the aliphatic and aromatic hydrocarbons are particularly outstanding. Suitable specific examples of these include: the aliphatic hydrocarbons, e. g., the pentanes, the hexanes, and the like; the aromatic hydrocarbons, e. g., benzene, toluene, the xylenes, and the like; the liquid hydrocarbon ethers, e. g., diethyl ether, dibutyl ether, and the like; the halogenated aliphatic hydrocarbons, e. g., chloroform, carbon tetrachloride, tetrachloroethane, and the like, as well as the halogenated aromatic hydrocarbon solvents, e. g., the chlorobenzenes, and the like.

The final stage of the reaction as has been illustrated specifically in the foregoing examples is somewhat akin to the final stages of the Grignard type reactions in that a hydrolysis step is necessary. It is preferable to carry out the hydrolysis stage using ice or ice/water mixtures which afford a method of controlling the hydrolysis. The new dicyclopentadienylironcarboxaldehydes of this invention are isolated from the final hydrolysis mixture by extraction procedures using a solvent for the aldomethyldicyclopentadienyliron compound. Suitable such solvents include the liquid hydrocarbon ethers, the liquid saturated alipahtic and aromatic hydrocarbons, as well as the liquid halogenated hydrocarbons, both saturated aliphatic and aromatic in nature. In short, these extractive solvents may in general be classified as of the same type usable as reaction media as has been discussed in some detail in the foregoing.

The aldomethyldicyclopentadienyliron compounds of this invention can be purified by crystallization using the aforementioned types of solvents. The recrystallization procedure sometimes proves less convenient and in such instances the compounds can conveniently be purified by sublimation onto a cold surface at elevated temperatures under reduced pressures. Generally, the sublimation purification is carried out in the range of 50–100° C. using conveniently a water-cooled condensation surface and operating at pressures in the range of 0.1 to 1.0 mm. of mercury.

In addition to dicyclopentadienyliron itself as specifically illustrated in the foregoing, there can be used in the preparation of these new carboxaldehyde derivatives the nuclear (i. e., on the cyclopentadiene nuclei) substituted derivatives of dicyclopentadienyliron wherein one or both of the cyclopentadienyl nuclei carry one or more aliphatic, aromatic, araliphatic, alkaromatic, or cycloaliphatic substituents. Suitable specific examples of these include cyclopentadienyl (ethylcyclopentadienyl) iron, bis (ethylcyclopentadienyl) iron, cyclopentadienyl (phenylcyclopentadienyl) iron, bis (phenylcyclopentadienyl) iron, cyclopentadienyl (cyclohexylcyclopentadienyl) iron, and the like. From these specific dicyclopentadienyliron derivatives there can be prepared, using the methods illustrated and explained in the foregoing, the corresponding mono- or polycarboxaldehyde, especially dicarboxaldehyde, substituted derivatives such as cyclopentadienyl (aldomethylethylcyclopentadienyl) iron, ethylcyclopentadienyl (aldomethylcyclopentadienyl) iron, bis (aldomethylethylcyclopentadienyl) iron, phenylcyclopentadienyl (aldomethylcyclopentadienyl) iron, cyclopentadienyl (aldomethylphenylcyclopentadienyl) iron, bis (aldomethylphenylcyclopentadienyl) iron, cyclohexylcyclopentadienyl (aldomethylcyclopentadienyl) iron, cyclopentadienyl (aldomethylcyclohexylcyclopentadienyl) iron, bis (aldomethylcyclohexylcyclopentadienyl) iron, and the like. For methods of preparation of the above substituted dicyclopentadienylirons see Weinmayr Ser. No. 352,283, filed April 30, 1953, and Graham and Whitman Ser. No. 352,294, filed April 30, 1953.

Thus, this invention is generic to the carboxaldehyde derivatives of dicyclopentadienyliron and the nuclear substituted derivatives thereof, preferably wherein the one or more substituents on either or both of the cyclopentadienyl nuclei are solely hydrocarbon, free of aliphatic unsaturation and generally of no more than seven carbons each, wherein at least one carboxaldehyde, aldehyde, formyl, or aldomethyl, i. e., —CHO, group is directly bonded to at least one of the nuclear carbons of at least one of the said cyclopentadienyl rings. It is to be noted that as a necessary and sufficient condition, the starting dicyclopentadienyliron derivative must have at least one hydrogen-bearing nuclear carbon in at least one of the cyclopentadienyl rings.

The proper nomenclature in this extremely new field is not at all clear yet and although the foregoing specific names of the new compounds of this invention are believed to be correct, it is to be noted that other methods of naming them exist with proper basis and might perhaps be more clear to those skilled in the chemical art. For instance, cyclopentadienyl (aldomethylcyclopentadienyl) iron might well also be termed cyclopentadienyl (aldehydocyclopentadienyl) iron or cyclopentadienyl (formylcyclopentadienyl) iron as well as dicyclopentadienylironaldehyde or carboxaldehyde.

These new aldomethyldicyclopentadienyliron compounds are, generically, colored crystalline solids, exhibiting ultraviolet and visible spectra containing characteristic absorption peaks for the dicyclopentadienyliron structure as well as the carbonyl and aldehydic CH groups. These new compounds are soluble in a wide range of organic solvents and more importantly certain of their easily regenerable derivatives are soluble in and stable in aqueous solution, thereby permitting their use directly in the obviously more convenient aqueous formulations. The new aldomethyldicyclopentadienyliron compounds of this invention are readily handled intermediates for the preparation of other new and interesting organometallic iron compounds. For instance, the cyclopentadienyl (aldomethylcyclopentadienyl) iron of Example I can readily and easily be oxidized to the useful cyclopentadienyl (carboxycyclopentadienyl) iron. The aldomethyldicyclopentadienyliron compounds in themselves are useful as anti-knock agents, pesticides, fungicides, and the like. In their utility as intermediates, there may be especially mentioned their use in the preparation of new and interesting organic dyestuffs.

The foregoing detailed description has been given for clearness of understanding only and no unnecessary limitations are to be understood therefrom. The invention is not limited to the exact details shown and described for obvious modifications will occur to those skilled in the art.

The invention claimed is:

1. Cyclopentadienyl(aldomethylcyclopentadienyl)iron.
2. Bis (aldomethylcyclopentadienyl) iron.
3. A substituted dicyclopentadienyliron compound wherein the iron atom is attached to two cyclopentadienyl nuclei, at least one of said cyclopentadienyl nuclei having directly bonded to nuclear carbon thereof the aldomethyl

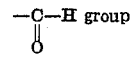

—C—H group and each of said cyclopentadienyl nuclei having as its sole substituent, in addition to said iron atom, no more than one aldomethyl group.

4. A substituted dicyclopentadienyliron compound wherein the iron atom is attached to two cyclopentadienyl nuclei, at least one of said cyclopentadienyl nuclei having directly bonded to nuclear carbon thereof the aldomethyl

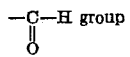 group and each of said cyclopentadienyl nuclei having as its sole substituents, in addition to said iron atom, no more than one aldomethyl group and no more than one monovalent hydrocarbon radical selected from the class consisting of aromatic, saturated aliphatic, and saturated cycloaliphatic hydrocarbon radicals, each of not more than seven carbon atoms.

References Cited in the file of this patent

UNITED STATES PATENTS

| 2,680,756 | Pauson | June 8, 1954 |
| 2,683,157 | Weinmayr | July 6, 1954 |

OTHER REFERENCES

Kealy and Pauson: Nature 168, 1039 (1951).
Woodward et al.: J. Am. Chem. Soc., vol. 74, pp. 3458–59, July 5, 1952.
Wagner et al.: "Synthetic Organic Chemistry," page 281 (1953).